(12) United States Patent
Sakaguchi et al.

(10) Patent No.: US 10,883,593 B2
(45) Date of Patent: Jan. 5, 2021

(54) DRIVING DEVICE

(71) Applicant: TOYOTA BOSHOKU KABUSHIKI KAISHA, Aichi (JP)

(72) Inventors: Wataru Sakaguchi, Aichi (JP); Toshiharu Kiriyama, Aichi (JP); Shoma Fukaya, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/388,469

(22) Filed: Apr. 18, 2019

(65) Prior Publication Data
US 2019/0323590 A1 Oct. 24, 2019

(30) Foreign Application Priority Data

Apr. 23, 2018 (JP) .................................. 2018-082356

(51) Int. Cl.
| | | |
|---|---|---|
| *F16H 57/039* | (2012.01) | |
| *F16H 57/021* | (2012.01) | |
| *F16H 55/08* | (2006.01) | |
| *F16H 55/17* | (2006.01) | |
| *F16H 1/16* | (2006.01) | |

(52) U.S. Cl.
CPC .......... *F16H 55/0813* (2013.01); *F16H 1/16* (2013.01); *F16H 55/17* (2013.01); *F16H 57/039* (2013.01); *F16H 2057/0213* (2013.01)

(58) Field of Classification Search
CPC .. F16H 1/16; F16H 57/039; F16H 2057/0213; F16H 55/24; F16H 2057/125; F16H 2057/126; F16H 2057/127; F16H 25/2003
See application file for complete search history.

(56) References Cited

U.S. PATENT DOCUMENTS

| 3,483,888 | A | * | 12/1969 | Wurzel | ................... F16K 51/00 |
|---|---|---|---|---|---|
| | | | | | 137/539 |
| 4,710,037 | A | * | 12/1987 | Newberg | ................ B25B 27/06 |
| | | | | | 384/537 |
| 5,015,897 | A | * | 5/1991 | Inagaki | .................. H02K 5/148 |
| | | | | | 310/239 |
| 5,624,193 | A | * | 4/1997 | Vogelsberger | ........ F16C 25/083 |
| | | | | | 267/163 |

(Continued)

FOREIGN PATENT DOCUMENTS

| JP | 08042537 | A | * | 2/1996 | ............... F16H 1/16 |
|---|---|---|---|---|---|
| JP | 2010-112414 | | | 5/2010 | |
| JP | 5435767 | B2 | * | 3/2014 | |

*Primary Examiner* — Bobby Rushing, Jr.
(74) *Attorney, Agent, or Firm* — Greenblum & Bernstein, P.L.C.

(57) ABSTRACT

A driving device in one aspect of the present disclosure includes an electric motor, a worm gear, a gear easing that stores the worm gear, a first fitting portion provided in the electric motor, a second fitting portion provided in the gear casing and fitting to the first fitting portion, and a restriction member that includes a pressure contact portion and a contact portion and restricts displacement of the worm gear along a rotation center axis thereof. The pressure contact portion is in pressure contact with one fitting portion out of the first fitting portion and the second fitting portion, and the contact portion is in contact with the other fitting portion.

8 Claims, 9 Drawing Sheets

(56) References Cited

U.S. PATENT DOCUMENTS

| | | | | |
|---|---|---|---|---|
| 5,791,884 A | * | 8/1998 | Iio | H01B 17/301 174/151 |
| 6,368,039 B2 | * | 4/2002 | Wolfe | F16B 21/186 310/91 |
| 2018/0105113 A1 | * | 4/2018 | Motomiya | B60R 1/072 |

* cited by examiner

DRIVING DEVICE

CROSS-REFERENCE TO RELATED APPLICATIONS

This application claims the benefit of Japanese Patent Application No. 2018-082356 filed on Apr. 23, 2018 with the Japan Patent Office, the entire disclosure of which is incorporated herein by reference.

BACKGROUND

The present disclosure relates to a driving device comprising a worm gear and an electric motor.

Failing off from a casing of a worm gear provided in a driving device disclosed in Japanese Unexamined Patent Application Publication No. 2010-112414 is restricted by a restriction member such as a push nut. In other words, the restriction member restricts displacement of the worm gear along a rotation center axis of the worm gear.

SUMMARY

As an example of a fixing structure of a restriction member, there is a structure in which a protrusion provided in an outer periphery of the restriction member is brought into pressure contact with a worm gear casing. In such a fixing structure, a technical problem as below may occur.

When a driving device continues to be used for a long time, a pressure contact part may become loose so that the restriction member is shifted from a position at the time of assembly due to a reaction force generated during rotation of the worm gear. When the restriction member is shifted from the position at the time of assembly, the worm gear is displaced along a rotation center axis thereof during rotation of the worm gear. This may generate noise.

In one aspect of the present disclosure, it is desirable to inhibit the generation of noise.

A driving device comprises, for example, an electric motor, a worm gear, a gear casing, a first fitting portion, a second fitting portion, and a restriction member. The electric motor generates a driving force. The worm gear receives the driving force from the electric motor to rotate. The gear casing stores the worm gear and rotatably supports the worm gear. The first fitting portion is provided in the electric motor. The second fitting portion is provided in the gear casing, and fits to the first fitting portion. The restriction member includes at least one pressure contact portion and at least one contact portion, and restricts displacement of the worm gear along a rotation center axis thereof. The pressure contact portion is in pressure contact with one fitting portion out of the first fitting portion and the second fitting portion. The contact portion is in contact with the other fitting portion.

Displacement of the restriction member of the driving device along a rotation axis of the worm gear is restricted when the pressure contact portion is brought into pressure contact with the one fitting portion and the contact portion is brought into contact with the other fitting portion.

Therefore, even if a pressure contact part becomes loose, the restriction member can he inhibited from being shifted from a position at the time of assembly by a reaction force generated during rotation of the worm gear. Further, since the restriction member is inhibited from being shifted from the position at the time of assembly, generation of noise can be inhibited.

The driving device may have the following configuration.

The second fitting portion may have a recess into which the first fitting portion fits. The pressure contact portion may bite into inner wall of the recess, and the contact portion may be in contact with a leading end of the first fitting portion.

The contact portion may be spaced apart from the inner wall of the recess. This can inhibit the contact portion from coming into contact with the inner wall of the recess, when an operator or an automatic assembling machine assembles the restriction member to the gear casing. Thus, decrease in assembling workability can be inhibited.

When the contact portion is brought into contact with the inner wall of the recess, the contact portion and the pressure contact portion are brought into contact with the inner wall of the recess. This may substantially reduce workability of the above operation.

The at least one contact portion may include a plurality of contact portions. A contact center may be located in a specified range around a fitting center. The contact center is a centroid of a figure drawn by the plurality of contact portions projected on a virtual plane orthogonal to a rotation center axis of the worm gear. The fitting center is a centroid of a figure drawn by a contour of the first fitting portion projected on the virtual plane.

Thus, the restriction member can he inhibited from being largely tilted when a force acts on the worm gear.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

An "embodiment of the present disclosure" described below shows an example embodiment within the technical scope of the present disclosure. In other word, matters recited in the claims are not limited to the specific configuration, structure, etc. defined in the embodiment below.

At least one member or portion is provided for a member or portion at least described with a reference numeral, except when that member or portion is explicitly described as "one member" or the like. In other words, two or more such members may be provided if there is no mention of "one member" or the like.

The present embodiment is an example in which a driving device according to the present disclosure is applied to a seat mounted on a vehicle or the like (hereinafter, referred to as a vehicle seat). Arrows and the like indicating directions attached to respective figures are provided to make it easy to understand the relationship between the respective figures.

Therefore, the present disclosure is not limited to the directions attached to the respective figures. The directions shown in the respective figures are directions in a state in which the vehicle seat according to the present embodiment is assembled to a vehicle.

First Embodiment

1. Overview of Vehicle Seat

Figure 1:
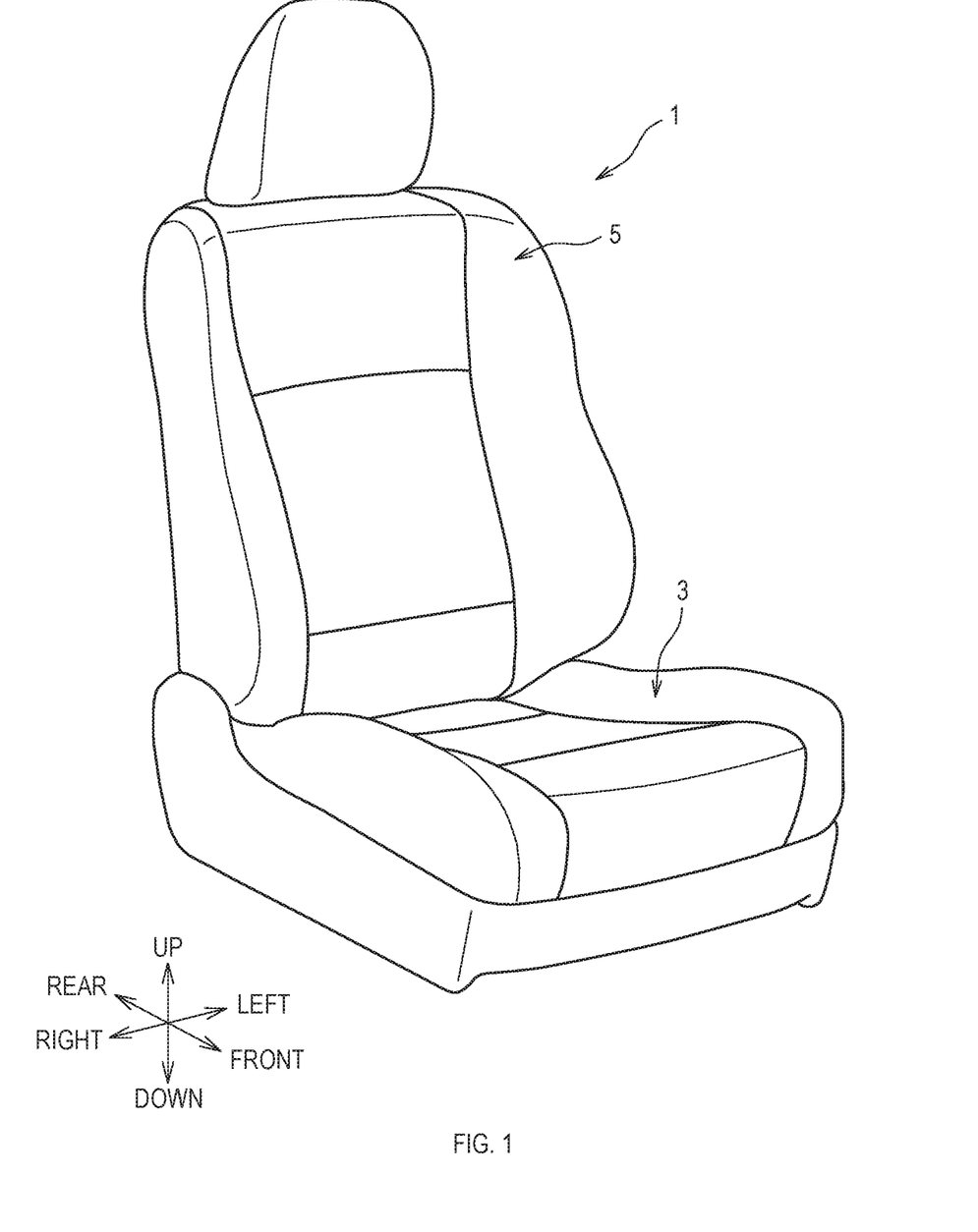
FIG. 1 is a diagram showing a vehicle seat according to a first embodiment.

A vehicle seat 1, as shown in FIG. 1, at least comprises a seat cushion 3 and a seatback 5. The seat cushion 3 supports the buttocks of a seated person. The seatback 5 supports the back of the seated person. A lower end portion of the seatback 5 is coupled to a rear end portion of the seat cushion 3.

The seatback 5 is pivotable (that is, reclinable) in a specified range about its lower end portion. A back frame 7 shown in FIG. 2 forms a framework of the seatback 5. A lower end portion of the back frame 7 is pivotably coupled to a rear end portion of a cushion frame (not shown).

Figure 2:
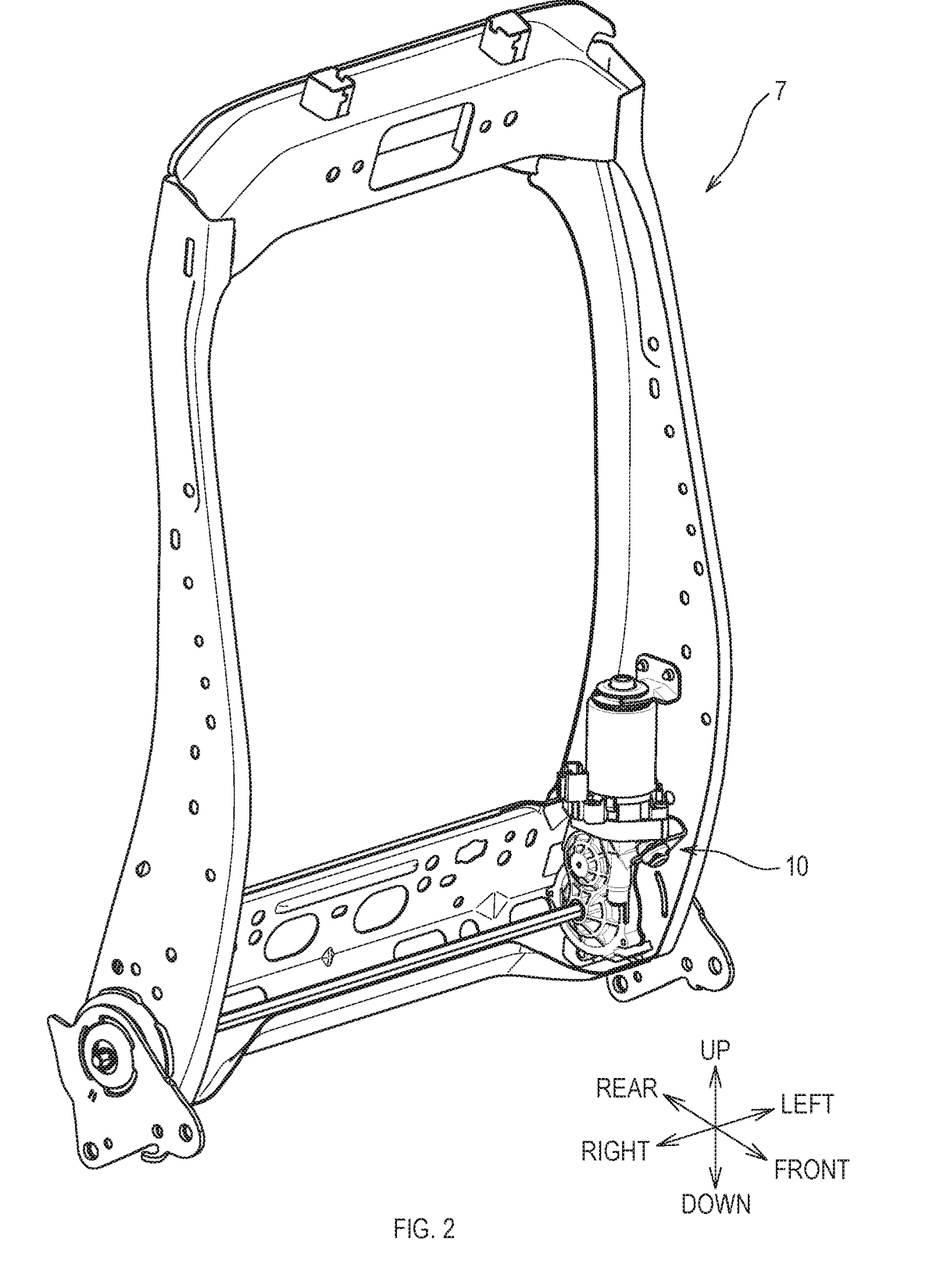
FIG. 2 is a diagram showing a back frame according to the first embodiment.

The cushion frame forms a framework of the seat cushion 3. A driving device 10 of the present embodiment exerts a driving force to pivot the back frame 7, that is, the seatback 5, when attached to the back frame 7.

2. Driving Device 2.1 Overview of Driving Device

Figure 3:
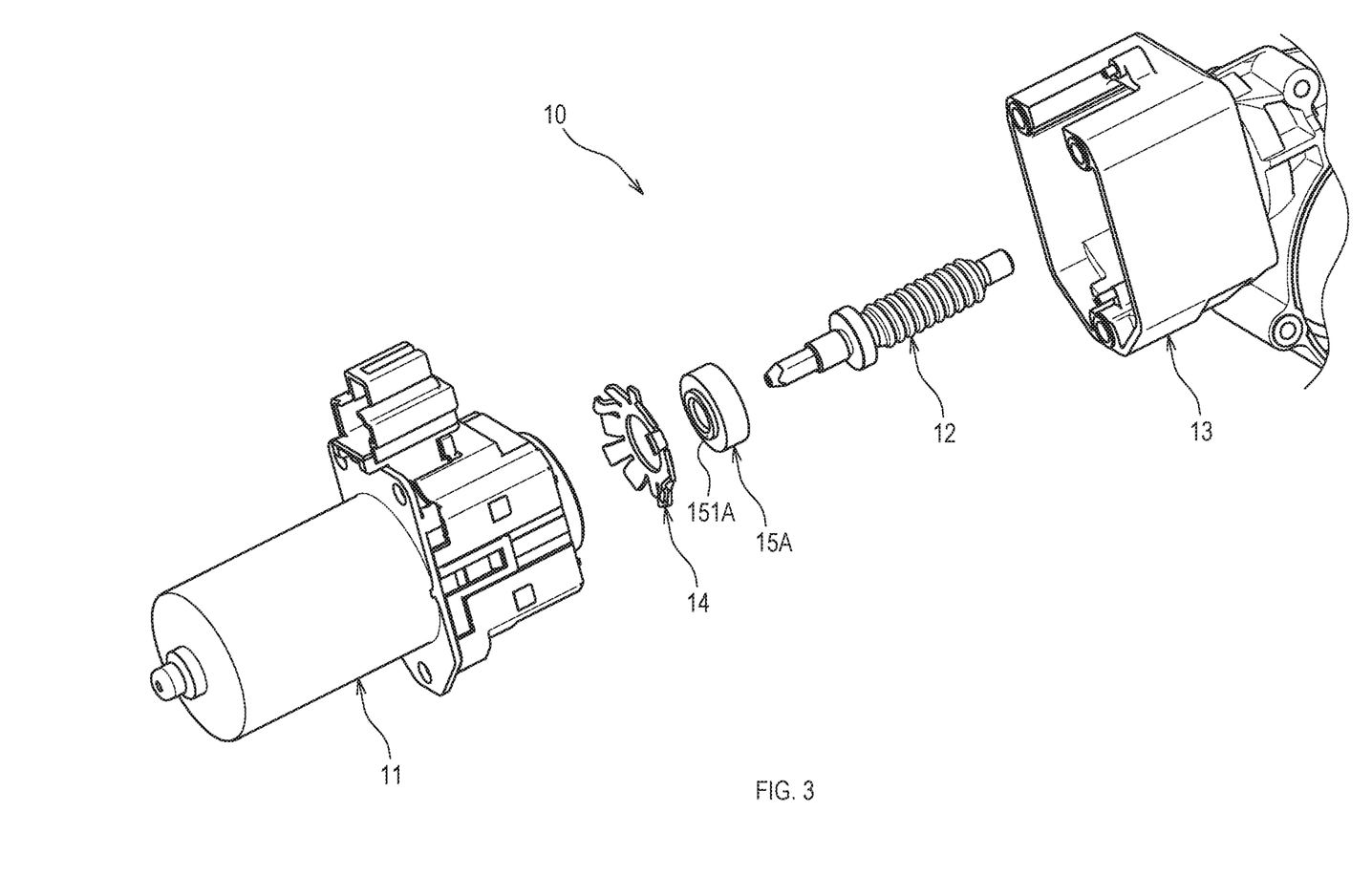
FIG. 3 is an exploded view of a driving device according to the first embodiment.

As shown in FIG. 3, the driving device 10 at least comprises an electric motor 11 (hereinafter, the motor 11), a worm gear 12, a gear easing 13, and a push nut 14.

The motor 11 is a driving source that generates the above-described driving force to be supplied to the worm gear 12. The motor 11 includes a later-described first fitting portion 11A on the worm gear 12 side.

The worm gear 12 is a screw gear that receives the driving force from the motor 11 to rotate. The driving force transmitted from the motor 11 to the worm gear 12 is outputted to a coupling rod that couples right and left sides of the back frame 7 via a worm wheel (not shown) that meshes with the worm gear 12.

Figure 4:
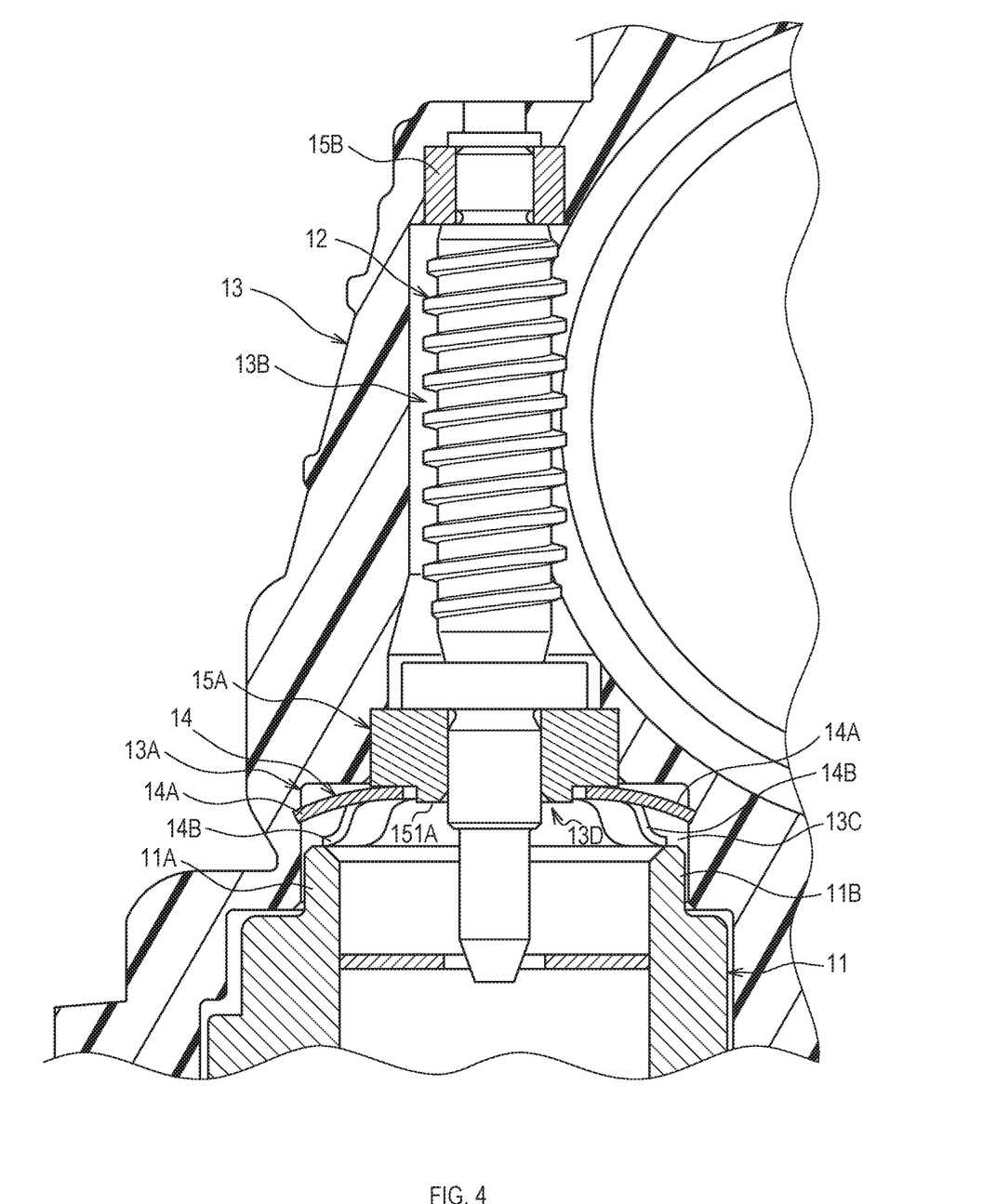
FIG. 4 is a diagram showing a worm gear portion of the driving device according to the first embodiment.

The gear casing 13 is made of resin. As shown in FIG. 4, the gear casing 13 includes a storage, portion 13B that stores the worm gear 12, and a second fitting portion 13A arranged on the motor 11 side of the storage portion 13B, and rotatably supports the worm gear 12 stored in the storage portion 13B. Inside the storage portion 13B, a first bearing portion 15A and a second bearing portion 15B are arranged. The first bearing portion 15A and the second bearing portion 15B are formed in a cylindrical shape and each support opposite ends of a rotation axis of the worm gear 12.

The first bearing portion 15A is arranged on the motor 11 side in the storage portion 13B and rotatably supports the worm gear 12. The second bearing portion 15B is arranged on the opposite side of the first bearing portion 15A in the storage portion 13B and rotatably supports the worm gear 12. A small diameter portion 151A is provided on a surface on the motor 11 side of the first bearing portion 15A. The small diameter portion 151A is formed in a cylindrical shape that protrudes to the motor 11 side from the surface of the first bearing portion 15A and has a smaller diameter than the first bearing portion 15A.

The first hearing portion 15A and the second bearing portion 15B are bearings that can receive a thrust load and a radial load that act on the worm gear 12. The thrust load is a load along a rotation center axis of the worm gear 12 (an up-down direction in FIG. 4). The radial load is a load orthogonal to the rotation center axis.

The second fitting portion 13A provided in the gear casing 13 fits to the first fitting portion 11A provided in the motor 11. The second fitting portion 13A of the present embodiment has a recess 13C concaved toward the worm gear 12 side from the motor 11 side. Specifically, the recess 13C is provided with an oval bottom surface, and a substantially cylindrical lateral surface that protrudes to the motor 11 side from the bottom surface. The bottom surface of the recess 13C includes the small diameter portion 151A.

The first fitting portion 11A includes a substantially cylindrical protrusion 11B that protrudes to the worm gear 12 side from the motor 11 side. The protrusion 11B enters inside the recess 13C. In a state in which the first fitting portion 11A and the second fitting portion 13A are fitted to each other, there is a space 13D between a leading end of the protrusion 11B and the bottom surface of the recess 13C. The rotation axis of the worm gear 12 supported by the first hearing portion 15A extends into the motor 11 through the space 13D and the first fitting portion 11A. Gears such as the worm wheel other than the worm gear 12 are also stored in the gear casing 13 of the present embodiment.

2.2 Push Nut

When the motor 11 is driven, a reaction force in a direction from the worm gear 12 to the motor 11 is generated in the worm gear 12. The reaction force causes the worm gear 12, the first bearing portion 15 and the like to displace along the rotation center axis. Further, the reaction force causes the worm gear 12 to fall off from the storage portion 13B. The push nut 14 is one example of a restriction member, which restricts displacement of the worm gear 12, the first bearing portion 15A and the like along the rotation center axis. In other words, the push nut 14 inhibits the worm gear 12 from falling off from the storage portion 13B.

Figure 6:
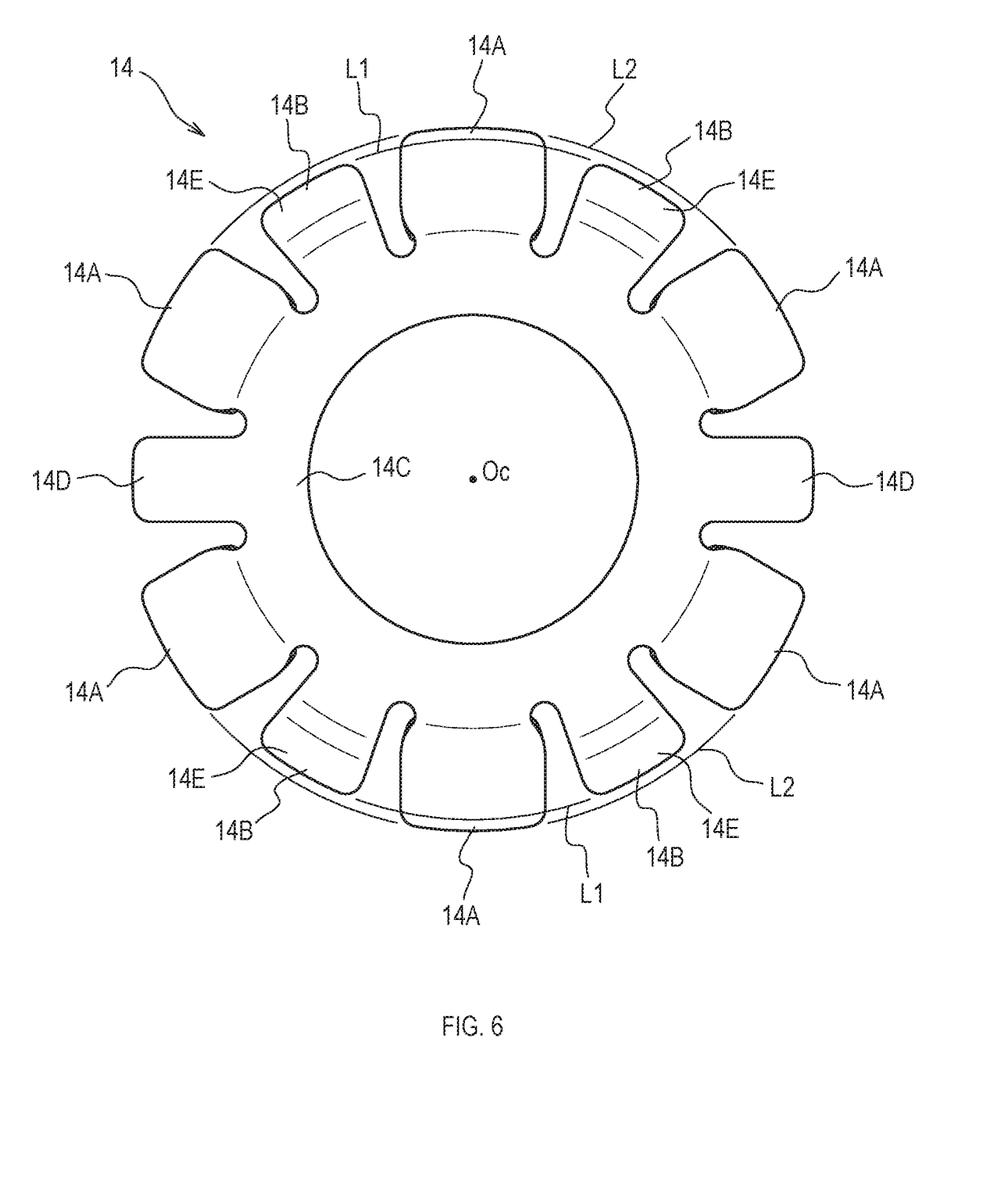
FIG. 6 is a diagram showing the push nut of the driving device according to the first embodiment.

The push nut 14, as shown in FIG. 6, is a substantially annular member. Specifically, as shown in FIG. 6, the push nut 14 includes an annular nut main body 14C, and at least one pressure contact portion 14A and at least one contact portion 14B that extend radially outward from an outer periphery of the nut main body 14C. In the present embodiment, the push nut 14 is provided with six pressure contact portions 14A and four contact portions 14B.

The plurality of pressure contact portions 14A, the plurality of contact portions 14B, and the nut main body 14C are integrally molded by press working a piece of metal plate. At least the plurality of contact portions 14B are formed by bending the metal plate.

Figure 5:
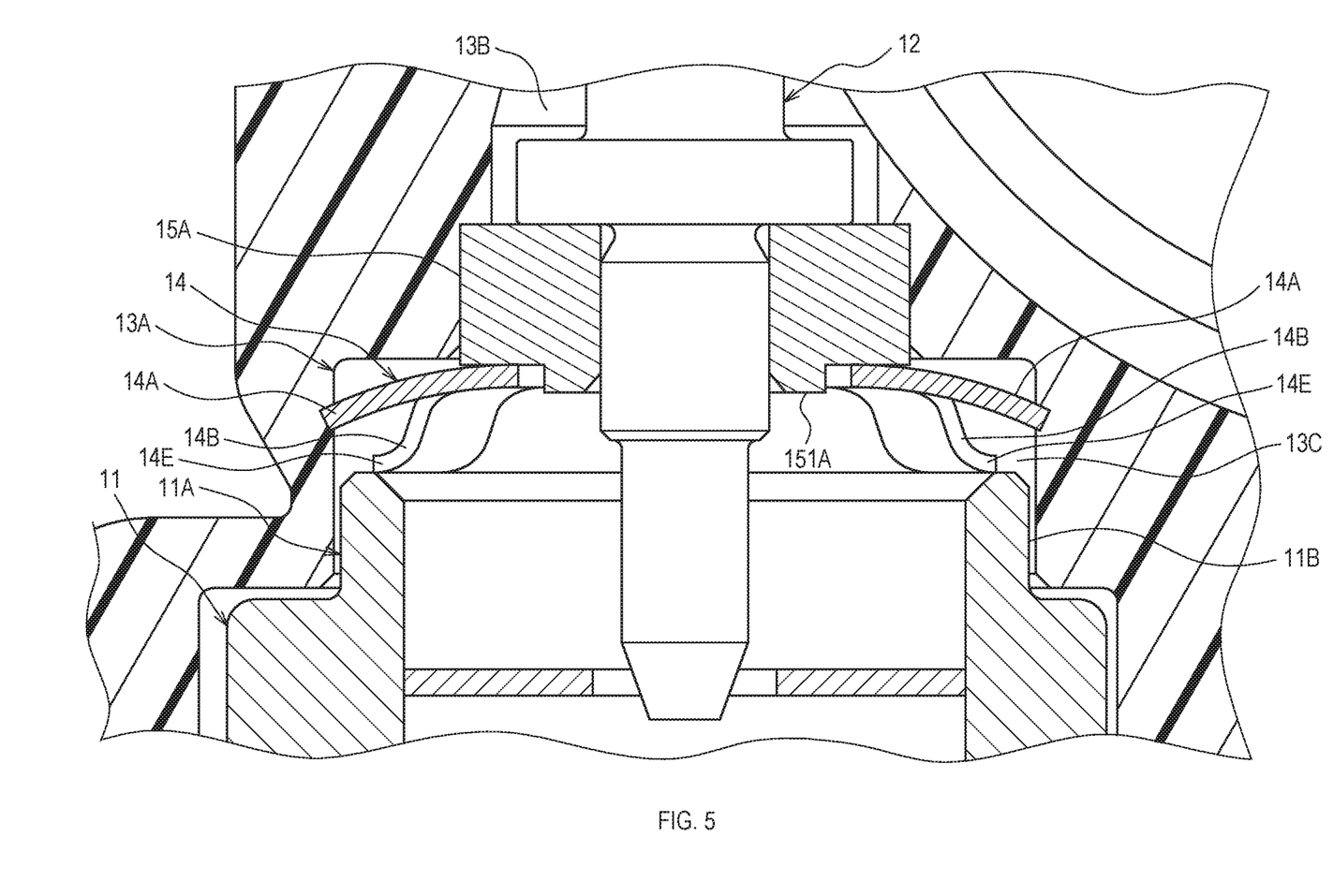
FIG. 5 is a diagram showing a push nut portion of the driving device according to the first embodiment.

In the present embodiment, as shown in FIG. 5, the plurality of pressure contact portions 14A are also formed by bending the metal plate. The plurality of pressure contact portions 14A and the plurality of contact portions 14B are each bent in the same direction with respect to the nut main body 14C.

The push nut 14 is pressed into the recess 13C from the motor 11 side toward the worm gear 12 side, and is fitted into the small diameter portion 151A. Thus, in a state in which the first fitting portion 11A and the second fitting portion 13A are fitted to each other, the push nut 14 is arranged in the space 13D.

The bending direction of the pressure contact portion 14A and the contact portion 14B is opposite to the direction of press fitting at the time of pressing the push nut 14 into the recess 13C. A leading end of the pressure contact portion 14A is shifted in a direction opposite to the direction of press fitting with respect to the nut main body 14C. In other words, in a state in which the push nut 14 is fitted into the small diameter portion 151A, the leading end of the pressure contact portion 14A is closer to the motor 11 side than the nut main body 14C.

Figure 7:
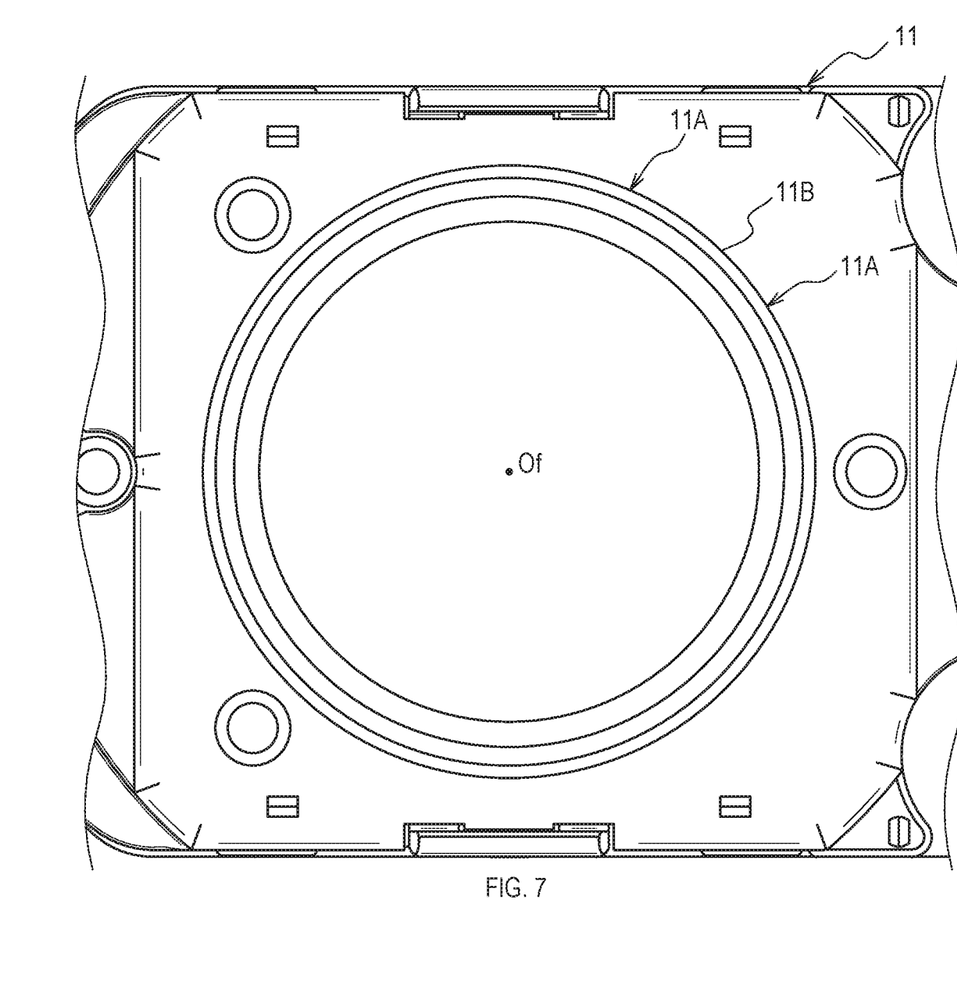
FIG. 7 is a diagram showing a first fitting portion of the driving device according to the first embodiment.

A contact center Oc (see FIG. 6) is located in a specified range around a fitting center Of (see FIG. 7). The contact center Oc is a centroid of a figure drawn by the plurality of contact portions 14B projected on a virtual plane (corresponding to a pa per plane in FIG. 6) orthogonal to the rotation center axis of the worm gear 12. The fitting center Of is a centroid of a figure drawn by the first fitting portion 11A projected on the virtual plane, that is, a contour of the protrusion 11B. The centroid is a point where an area moment is zero in a plane figure.

In a nominal value, it is desirable that the contact center Oc and the fitting center Of coincide with each other. However, in the actual driving device 10, the contact center Oc is located in a specified range around the fitting center Of, due to dimensional variation or the like.

As shown in FIG. 5, each pressure contact portion 14A is in pressure contact with the second fitting portion 13A, that is, inner wall of the recess 13C. Each pressure contact portion 14A of the present embodiment is a metal member, and the leading end of the pressure contact portion 14A bites into the inner wail of the resin-made recess 13C.

In detail, a corner portion (an edge portion) of the leading end of each pressure contact portion 14A is in contact with the inner wall of the recess 13C. The corner portion indicates a corner of a section plane of a metal plate produced upon press molding each pressure contact portion 14A.

Figure 8:
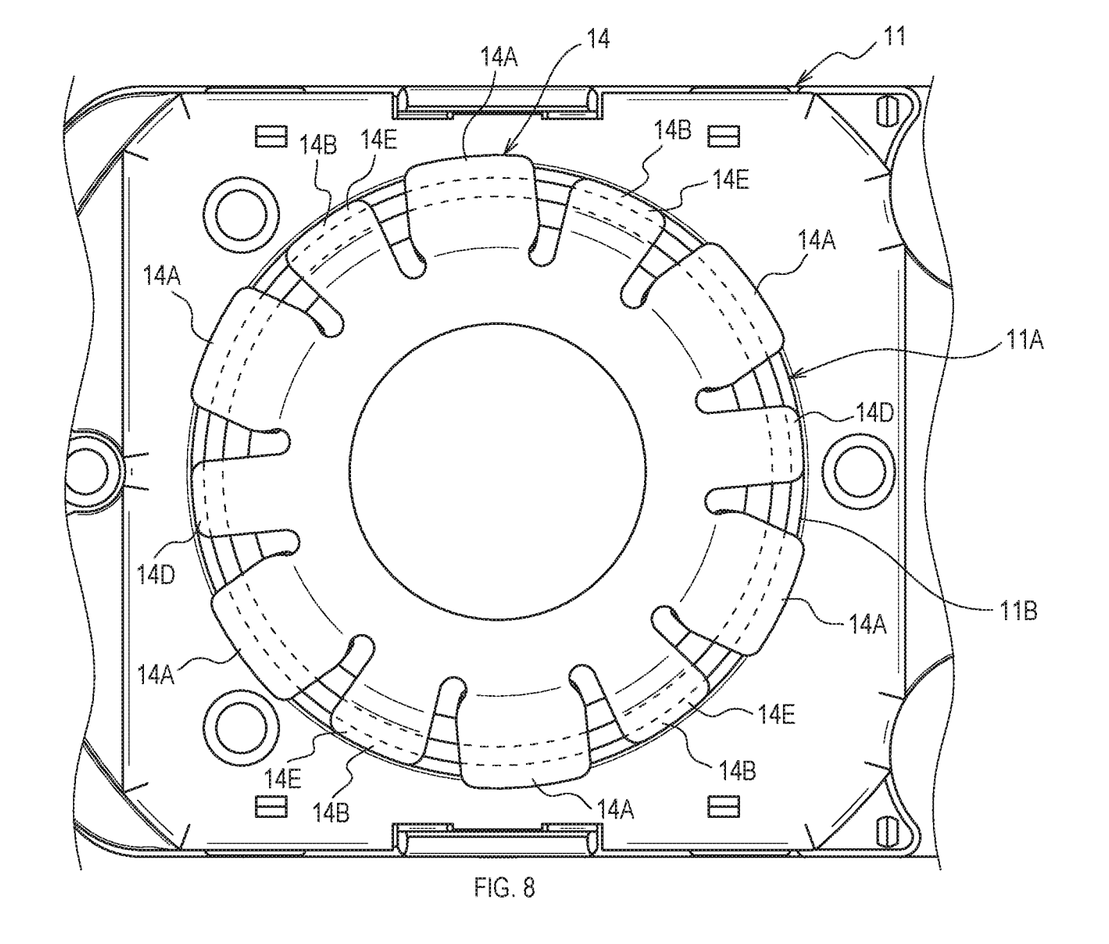
FIG. 8 is a diagram showing the first fitting portion and the push nut of the driving device according to the first embodiment.
Figure 9:
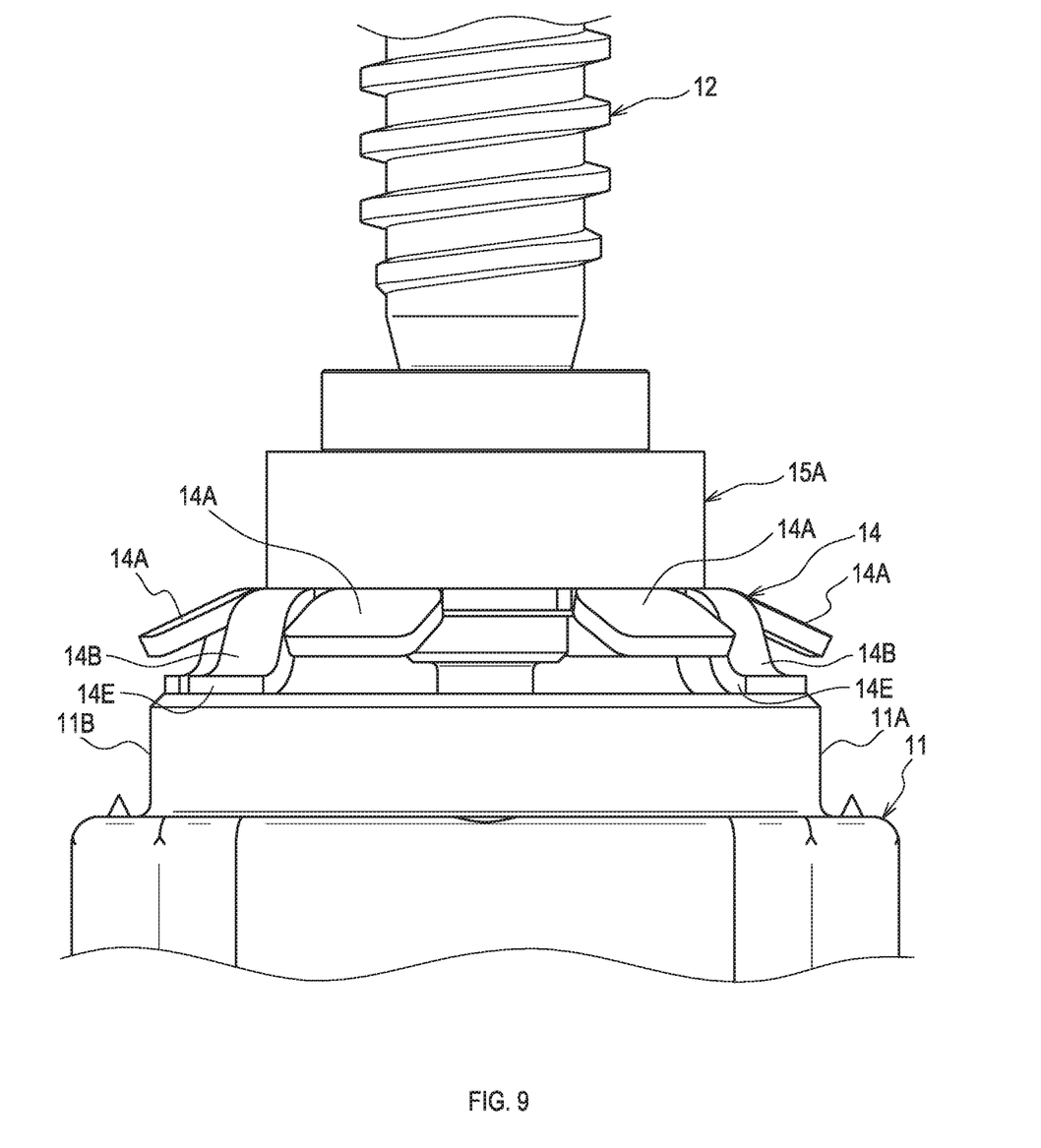
FIG. 9 is a diagram showing the push nut portion of the driving device according to the first embodiment.

Each contact portion 14B is in contact with the first fitting portion 11A. Specifically, as shown in FIGS. 8 and 9, each contact portion 14B is provided with a planar face portion 14E formed by bending a leading end side of the contact portion 14B. The planar face portion 14E of each contact portion 14B is in contact with the first fitting portion 11A, that is the leading end of the protrusion 11B.

As described above, even if the reaction force in a direction toward the motor 11 is generated in the worm gear 12, displacement of the push nut 14 along the rotation axis is restricted since each pressure contact portion 14A is in pressure contact with the second fitting portion 13A and each contact portion 14B is in contact with the leading end of the first fitting portion 11A (see FIG. 5).

As shown in FIG. 5, each contact portion 14B is spaced apart from the inner wall of the recess 13C. Therefore, as shown in FIG. 6, an imaginary line L1 that couples the leading ends of the respective contact portions 14B is located radially inward of an imaginary line L2 that couples the leading ends of the respective pressure contact portions 14A.

The push nut 14 is further provided with a portion 14D that extends radially outward from the outer periphery of the nut main body 14. The portion 14D is used for gripping or chucking the push nut 14 at the time of press fitting in which the push nut 14 is fitted. into the recess 13C (the small diameter portion 151A in detail). The push nut 14 may not be provided with the portion 14D. Also, the push nut 14 may be provided with the pressure contact portion 14A or the contact portion 14B, instead of the portion 14D, at a position where the portion 14D is provided.

3. Characteristics of Driving Device (Specifically, Push Nut) According to Present Embodiment The push nut 14 includes at least one pressure contact portion 14A in pressure contact with the second fitting portion 13A and at least one contact portion 14B in contact with the first fitting portion 11A. This restricts displacement of the push nut 14 along the rotation axis, when each pressure contact portion 14A is brought into pressure contact with the second fitting portion 13A and each contact portion 14B is brought into contact with the first fitting portion 11A.

Therefore, even if any of the pressure contact portions 14A becomes loose, the push nut 14 can be inhibited from being shifted from the position at the time of assembly due to the reaction force generated during rotation of the worm gear 12. Further, since the push nut 14 is inhibited from being shifted from the position at the time of assembly, generation of noise can be inhibited.

The pressure contact portion 14A bites into the inner wall of the recess 13C, and the contact portion 14B is in contact with the leading end of the protrusion 11B. This can appropriately inhibit the push nut 14 from being shifted from the position at the time of assembly.

The contact portion 14B is spaced apart from the inner wall of the recess 13C. This can inhibit the contact portion 14B from coming into contact with the inner wall of the recess 13C, when the operator or the automatic assembling machine assembles the push nut 14 to the gear easing 13. Accordingly, decrease in assembling workability can be inhibited.

When the contact portion 14B is brought into contact with the inner wall of the recess 13C, the contact portion 14B and the pressure contact portion 14A are in contact with the inner wall of the recess 13C. This may substantially reduce workability of the above operation.

The contact center Oc is located in a specified range around the fitting center Of. This can inhibit the push nut 14 from being largely tilted when a force acts on the worm gear 12.

In other words, the reaction force generated during rotation of the worm gear 12 is a force to press the push nut 14 toward the protrusion 11B. The force is distributed to the plurality of contact portions 14B and acts on the protrusion 11B. A resultant force of pressing forces generated in the respective contact portions 14B is a force to act on the contact center Oc.

Therefore, when the contact center Oc is shifted with respect to the fitting center Of, a moment that causes the push nut 14 to tilt is generated. On the contrary, in the present embodiment, since the contact center Oc is located in a specified range around the fitting center Of, excessive increase in the moment is inhibited. Further, the push nut 14 can be inhibited from being largely tilted.

In the present embodiment, each portion 14B projected on the above-described virtual plane is congruent. Therefore, the contact center Oc of the present embodiment is a simple centroid of a figure drawn by the plurality of contact portions 14B projected on the above virtual plane.

However, if each contact portion 14B is different in shape from each other, the contact center Oc will be a centroid calculated on the assumption that each contact portion 14B projected on the above virtual plane has the same area (1 for example).

The first fitting portion 11A of the present embodiment is formed in a tubular shape, and has a constant thickness at the tubular part. Therefore, the fitting center Of in the present embodiment is a simple centroid of a figure drawn by the tubular first fitting portion 11A projected on he above virtual plane. However, if the thickness of the tubular part is not constant, the fitting center Of will he a centroid calculated on the assumption that the thickness is constant (1 for example).

The driving device 10 of the present embodiment can use the same components as those of an existing driving device, except for the push nut 14. In other words, any driving device that incorporates the push nut 14 according to the present embodiment can produce the same effect as the driving device 10 of the present embodiment.

The corner portion (the edge portion) of the leading end of each pressure contact portion 14A is in contact with the inner wall of the recess 13C. This allows the operator or the automatic assembling machine that attaches the push nut 14 to cause each pressure contact portion 14A to appropriately bite into the inner wall.

The leading ends of the plurality of pressure contact portions 14 are shifted in the direction opposite to the direction of press fitting with respect to the nut main body 14C. Thus, when a force in a direction to cause the worm gear 12 to fall off acts on the push nut 14, the force acts on the push nut 14 as a force to cause each pressure contact portion 14A to bite into the inner wall. Shift in position of the push nut 14 can be appropriately inhibited.

The planar face portion 14E is provided at a portion of each contact portion 14B that comes into contact with the protrusion 11B. This can inhibit excessive increase in contact surface pressure between each contact portion 14B and the protrusion 11B. Further, when the force in the direction to cause the worm gear 12 to fall off acts on the push nut 14, biting into the protrusion 11B by the force by each contact portion 14B can be inhibited.

Other Embodiments

In the above-described embodiment, each pressure contact portion 14A is in pressure contact with the second fitting portion 13A, and each contact portion 14B is in contact with the first fitting portion 11A. The present disclosure is not limited to this. The present disclosure may be configured, for example, such that each pressure contact portion 14A is in pressure contact with the first fitting portion 11A, and each contact portion 14B is in contact with the second fitting portion 13A.

In the above-described embodiment, the second fitting portion 13A has the recess 13C into which the first fitting portion 11A fits, and the first fitting portion 11A includes the tubular protrusion 11B. The present disclosure is not limited to this. The present disclosure may be configured, for example, such that the first fitting portion 11A has a recess into which the second fitting portion 13A fits, and the second fitting portion 13A includes a tubular protrusion.

In the above-described embodiment, each pressure contact portion 14A is configured to bite into the inner wall of the recess 13C. The present disclosure is not limited to this. The present disclosure may be configured, for example, such that each pressure contact portion 14A is configured to be brought into pressure contact with the inner wall of the recess with a pressure equal to or higher than a specified contact surface pressure, without biting into the inner wall of the recess.

The push nut 14 according to the above-described embodiment includes six pressure contact portions 14A and four contact portions 14B. The present disclosure is not limited to this. The present disclosure may be configured, for example, such that there are an odd number or an even number, other than six, of pressure contact portions 14A, or an odd number or an even number, other than four, of contact portions 14B.

In the above-described embodiment, the contact center Oc is located in a specified range around the fitting center Of. The present disclosure is not limited to this. The present disclosure may be configured such that the contact center Oc is largely shifted with respect to the fitting center Of, for example.

In the above-described embodiment, the driving device according to the present disclosure is applied to the driving device 10 that exerts the driving force to cause the seatback 5 to pivot. The present disclosure is not limited to this. The present disclosure can be applied, for example, to a driving device that exerts a driving force to ascend and descend a vehicle seat, or to move a vehicle seat in a front-rear direction of the seat.

The plurality of pressure contact portions 14A and the plurality of contact portions 14B according to the above-described embodiment have shapes considering press formability. The present disclosure is not limited to this. The pressure contact portion 14A and the contact portion 14B of the present disclosure are not limited to have the shapes shown in the figures, and may have any shapes as long as their functions can be achieved.

In the above-described embodiments, the driving device of the present disclosure is applied to a vehicle seat. However, application of the present disclosure is not limited to this. The present disclosure can be also applied to a seat for use in a vehicle such as railway vehicles, ships and boats, and aircrafts, as well as to a stationary type seat for use such as in theatres and at home.

Furthermore, the present disclosure is not limited to the above-described embodiments as long as the present disclosure meets the gist of the invention described in the above embodiments. Thus, at least two embodiments among the plurality of embodiments described above may be combined, or any of the constituent features described in the above embodiments may be eliminated.

What is claimed is:

1. A driving device comprising:
an electric motor that is configured to generate a driving force;
a worm gear that is configured to receive the driving force from the electric motor to rotate;
a gear casing that stores the worm gear, and rotatably supports the worm gear;
a protrusion that is provided to the electric motor, and protrudes to the worm gear side from the electric motor side;
a recess that is provided in the gear casing, and into which the protrusion fits; and
a restriction member that is arranged between a bottom surface of the recess and a leading end of the protrusion, and restricts displacement of the worm gear along a rotation center axis thereof,
the restriction member including:
an annular nut main body, wherein the rotation center axis of the worm gear is inserted through the annular nut main body;
a pressure contact portion that extends radially outward from an outer periphery of the nut main body, and is in pressure contact with an inner wall of the recess; and
a contact portion that extends radially outward from the outer periphery of the nut main body, and is in contact with the leading end of the protrusion.

2. A driving device comprising:
an electric motor that is configured to generate a driving force;
a worm gear that is configured to receive the driving force from the electric motor to rotate;

a gear casing that stores the worm gear, and rotatably supports the worm gear;

a first fitting portion that is provided to the electric motor;

a second fitting portion that is provided in the gear casing, and fits to the first fitting portion; and a restriction member that includes at least one pressure contact portion and at least one contact portion, and restricts displacement of the worm gear along a rotation center axis thereof, the pressure contact portion being in pressure contact with one fitting portion out of the first fitting portion and the second fitting portion, and the contact portion being in contact with the other fitting portion, wherein the restriction member further includes an annular nut main body, wherein the pressure contact portion and the contact portion extend radially outward from an outer periphery of the nut main body, and wherein the rotation center axis of the worm gear is inserted through the nut main body.

3. The driving device according to claim 2, wherein the second fitting portion has a recess into which the first fitting portion fits, and wherein the pressure contact portion bites into an inner wall of the recess, and the contact portion is in contact with a leading end of the first fitting portion.

4. The driving device according to claim 3, wherein the contact portion is spaced apart from the inner wall of the recess.

5. The driving device according to claim 3, wherein the restriction member is arranged between a bottom surface of the recess and the leading end of the first fitting portion.

6. The driving device according to claim 3, wherein the contact portion includes a planar face portion that comes into contact with the leading end of the first fitting portion.

7. The driving device according to claim 2, wherein the at least one contact portion includes a plurality of contact portions, wherein a contact center is located in a specified range around a fitting center, the contact center being a centroid of a figure drawn by the plurality of contact portions projected on a virtual plane orthogonal to the rotation center axis of the worm gear, and the fitting center being a centroid of a figure drawn by a contour of the first fitting portion projected on the virtual plane.

8. A restriction member for a driving device, the driving device comprising:
 an electric motor that is configured to generate a driving force;
 a worm gear that is configured to receive the driving force from the electric motor to rotate;
 a gear casing that stores the worm gear, and rotatably supports the worm gear;
 a first fitting portion that is provided to the electric motor; and
 a second fitting portion that is provided in the gear casing, and fits to the first fitting portion, the restriction member comprising:
 a pressure contact portion that is configured to be in pressure contact with one fitting portion out of the first fitting portion and the second fitting portion; and
 a contact portion that is configured to be in contact with the other fitting portion, and the restriction member restricting displacement of the worm gear along a rotation center axis thereof.

* * * * *